July 25, 1950  A. N. KERR  2,516,218
HYDROCARBON VAPORIZER
Filed July 8, 1946  2 Sheets—Sheet 2

INVENTOR.
A.N. KERR
BY
Hudson and Young
ATTORNEYS

Patented July 25, 1950

2,516,218

UNITED STATES PATENT OFFICE 2,516,218

HYDROCARBON VAPORIZER

Arthur N. Kerr, Los Angeles, Calif., assignor to Phillips Petroleum Company, a corporation of Delaware Application July 8, 1946, Serial No. 681,915

6 Claims. (Cl. 62—1)

This invention relates to hydrocarbon vaporizer systems. In one particular aspect it relates to small vaporizers adapted for preparing liquefied petroleum gases for combustion in household gas burners or similar service. In another particular aspect it relates to sensitive and fast acting pressure responsive means for intermittently admitting liquid hydrocarbons into a vaporization chamber.

Liquefied petroleum gases, such as commercial butane, are extensively sold for household fuel in regions not supplied by ordinary gas mains. Such liquefied gases must be vaporized before use in conventional gas burners. The methods of performing this vaporization may be divided into two general classes: a first class in which liquefied gases are allowed to vaporize in a storage tank containing the liquid while gas is withdrawn for use from a vapor space above the liquid level in the storage tank, and a second class in which quantities of liquid are withdrawn from the main body of liquid in a storage tank, either batchwise or continuously, and are vaporized in other equipment.

Vaporization of liquefied petroleum gases by methods of the first class is very unsatisfactory. Since it is not commercially feasible to sell a purified hydrocarbon as fuel, the products on the market, such as commercial butane, are mixtures of hydrocarbons having different volatilities. During the evaporation of such a mixture the hydrocarbons having lowest boiling points tend to evaporate first and the vapors first evolved will contain a greater proportion of low-boiling materials, such as propane, than the residual liquid. As a result the B. t. u. value of the gas first evolved is considerably different from that of the gas evolved later in the evaporation of a tankful of liquid. Such change in the heating value of the gas is very undesirable. Accompanying this change in heating value is a change in the proper ratio of gas to air necessary to secure efficient combustion and burners must be adjusted frequently during the evaporation of a tank of liquid.

Methods of the second class mentioned above frequently employ a flash reduction of pressure to secure vaporization of the hydrocarbon liquid. Since heat of vaporization is absorbed in such flashing, there is a sharp reduction of temperature at the point where pressure is reduced. Minute traces of moisture are usually present in the hydrocarbon liquid and these tend to freeze upon and cause sticking of the pressure reducing valve.

In any method used for evaporating such hydrocarbon liquids, some means for supplying heat equivalent to the latent heat of vaporization must be employed. Steam, water or hot gases formed by burning a portion of the evolved gases as taught by Martin 2,084,297 have been used. Such methods of evaporation are frequently uneconomical due to poor utilization of the heat applied, and the industry desires an evaporator which is economical in utilization of heat. Since such hydrocarbons are substantially completely vaporized at temperatures below 35° F., absorption of heat from the atmosphere or ground may also be used except in cold weather when such means are inadequate.

A small domestic vaporizer for evaporating hydrocarbon liquid withdrawn from such storage tanks in amount just sufficient to maintain the desired range of gas pressure in lines leading to burners, which is not subject to operational difficulties due to freezing of pressure reduction valves and which is efficient in utilization of heat is a greatly desired improvement in the art.

It is an object of this invention to provide such a liquefied petroleum gas vaporizer for household use wherein vaporization occurs over a large area and which has pressure responsive means for controlling the amount of liquid admitted for vaporization.

Another object is to provide a vaporizer of the class described wherein vaporization does not occure at a valve.

Another object is to provide a vaporizer of the class described which is efficient in utilization of heat and which is adapted to serve as a source of chilled water.

Another object is to provide a novel pressure responsive valve mechanism suitable for controlling the quantity of liquefied petroleum gas admitted to such vaporizer.

Another object is to provide a liquefied petroleum gas vaporizer which is simple, rugged, cheap in construction and dependable in operation.

Still another object is to provide a vaporizer of the class described which has the particular advantageous arrangement and relationship of parts shown and described.

Numerous other objects and advantages will be obvious to those skilled in the art upon reading the accompanying specification, claims and drawings.

Drawings

In the accompanying drawings.

Figure 1:
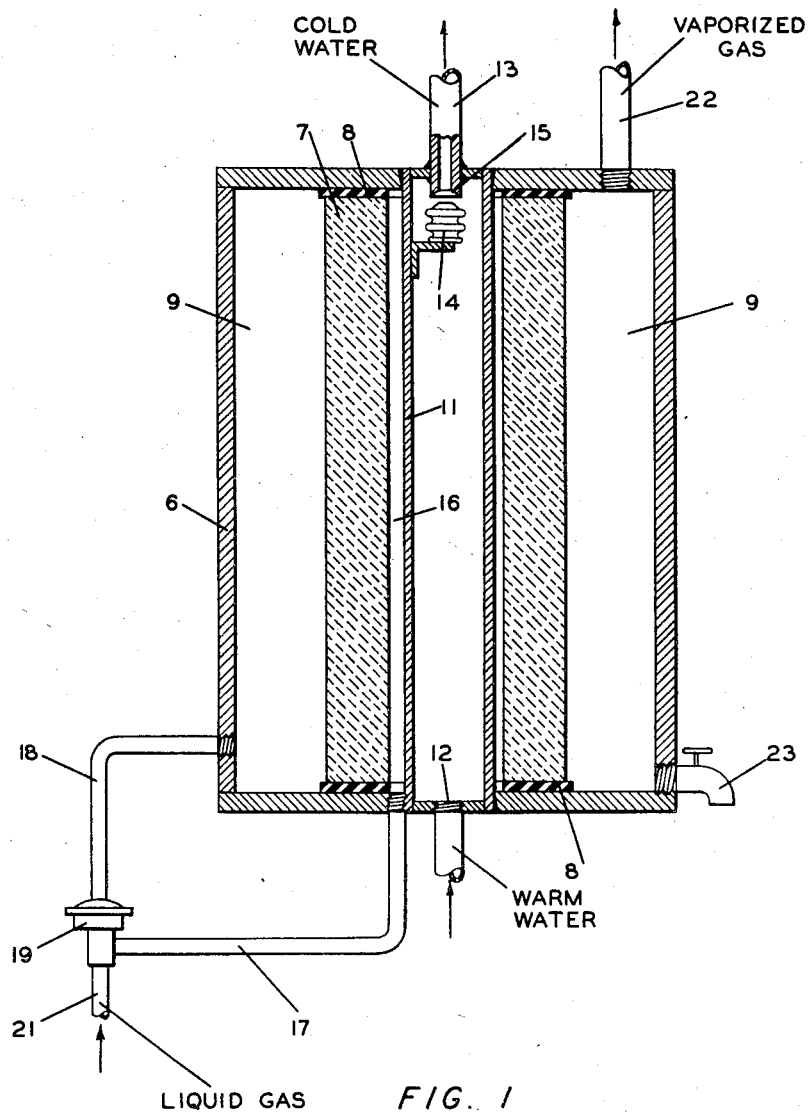
Fig. 1 is an elevational view of a vaporizer system embodying my invention with parts in section to show details of construction.
Figure 2:
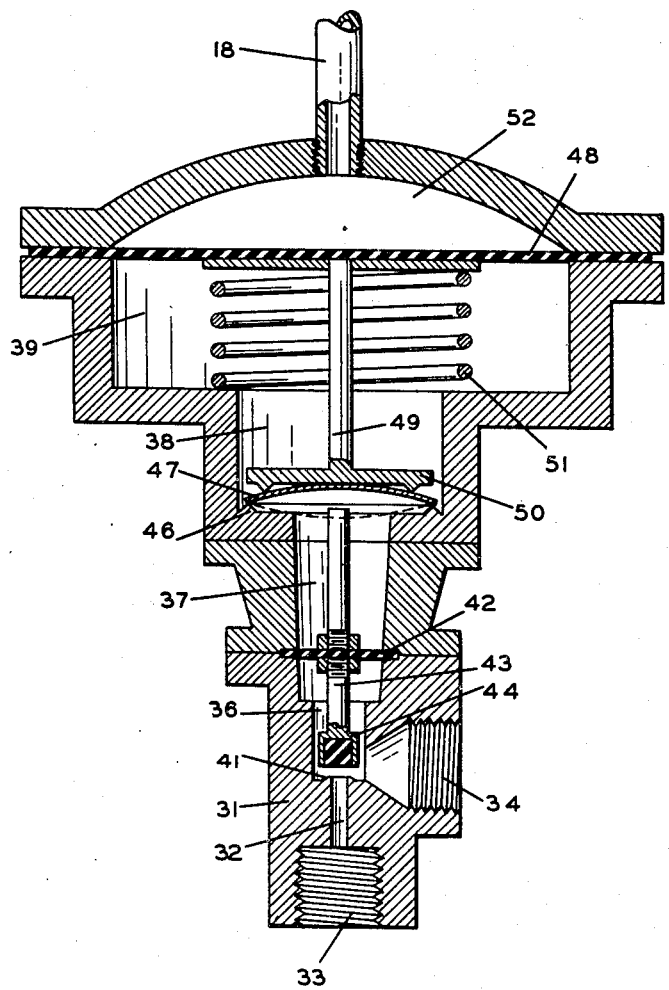
Fig. 2 is an elevational cross-sectional view of one form of motor valve which may be employed in the construction of motor valve 19 of Fig. 1.

Referring to Fig. 1, a housing 6 encloses a hollow cylinder 7 of porous inert material, preferably carbon, leaving a space 9, suitable for use as a reservoir of gas between the sides of the cylinder and walls of the housing. Annular sealing members 8 are disposed between the ends of cylinder 7 and adjacent walls of housing 6 in fluidtight sealing relation with each. A tube 11 having an inlet 12 and an outlet 13 extends through housing 6 with its outer wall in gastight sealing relation with the walls of the housing. A thermostat actuated valve 14 is disposed in tube 11 and is adapted to seat upon a valve seat 15, shown as integral with outlet tube 13, and thereby substantially close said outlet. Tube 11 is so disposed as to leave a small space 16 between the external surface of the tube and the internal surface of cylinder 7, which has an internal diameter substantially greater than the external diameter of tube 11. One end of a pipe 17 is inserted into housing 6 communicating with space 16. The other end of pipe 17 is attached to the outlet of a snap-action, pressure responsive valve 19, constructed as shown in Fig. 2. The inlet of valve 19 is connected with line 21 leading to a source of liquefied gases. Line 18 provides free communication between pressure responsive means in valve 19 and gas under pressure in space 9. A pipe 22 is inserted into an upper portion of space 9 adapted to withdraw gas therefrom. A valved line 23 is inserted into a lower portion of the same space for withdrawal of residual liquid.

Fig. 2 shows valve 19 in detail. A valve body 31 is provided with a passage 32 having an inlet 33 and an outlet 34. The inlet and outlet are adapted to be connected to piping. The valve body also has a cavity 36, 37, 38, 39 of diversified cross section therein. A narrower portion 36 of this cavity communicates with passage 32 and a wider portion 37 of the cavity. An annular valve seat 41 is disposed in passage 32.

A flexible diaphragm is disposed across cavity portion 37 in fluidtight sealing relation with the walls thereof. A valve stem 43 extends through this diaphragm and at its lower end is connected to a movable valve head 44, adapted to be moved to seat upon valve seat 41 and thereby substantially close passage 32.

Adjacent to the upper end of valve stem 43 an annular supporting ring 46 is disposed in a still larger cavity portion 38. A spherically curved spring disc 47 is disposed in cavity portion 38 resting upon supporting ring 46. Disc 47 is adapted to curve upward, normally, and to be out of contact with valve stem 43, but upon being deformed under pressure beyond the point of being flat is adapted to spring into substantially equal and opposite curvature, as shown by the dotted line, striking the end of the valve stem a sharp blow and forcing the valve stem down to carry valve head 44 into position to seat on valve seat 41 thereby closing passage 32. Disc 47 is so constructed that upon release of pressure holding it down with a concave upper side it will spring or snap back into shape with a convex upper side. Such discs are old and well known in numerous devices.

A large flexible diaphragm 48 is installed across the largest cavity portion 39 in gas tight contact with the walls thereof. A thrust member 49 having a head 50 is attached to diaphragm 48 and is adapted to transmit pressure from said diaphragm to disc 47. A resilient member, shown as a coil spring 51 is disposed in cavity portion 39 adapted to resist downward motion of diaphragm 48 by predetermined force. That part of cavity portion 39 which lies above diaphragm 48 is cut off by the diaphragm to form gas chamber 52. Pipe 18 is inserted through a wall of this chamber and is adapted to establish free communication between this chamber and space 9 as shown in Fig. 1.

In some instances other means of providing snap action, such as levers and springs, may be employed, but for reasons of simplicity and sure operation I prefer to use disc 47.

*Operation*

The apparatus shown in Fig. 1 is connected to a supply of liquefied petroleum gas such as a storage tank via line 21 and to a source of warm water such as a domestic water line, via inlet pipe 12. Outlet pipe 13 may be connected to any means for utilizing chilled water desired or to waste in the absence of such use. Pipe 22 leads to burners of the type mentioned.

Starting with the thermostat controlled valve 14 in the open position as shown, warm water enters tube 11 until the temperature becomes high enough to cause valve 14 to close. When water contained in tube 11 becomes sufficiently chilled, valve 14 opens and entering warm water forces chilled water out through outlet 13. Since water in passing through the tube 11 is not exposed to gases, outlet 13 may serve as an intermittent source for chilled drinking water, usually a very desirable advantage in isolated locations.

The vaporization cycle begins with valve 19 in open position. Liquefied petroleum gases flow from a source through line 21, valve 19 and line 17 and enter the narrow space 16 in liquid phase. Since the porous cylinder 7 offers considerable resistance to liquid flow, the liquefied gases rise in space 16 and receive heat transmitted through the walls of tube 11. This results in boiling of the liquid with escape of gases through the porous cylinder into space 9. Liquid also seeps through the porous cylinder but sufficient heat is transmitted by flow of fluid to vaporize such liquid.

Gas pressure builds up in space 9 and such pressure is communicated via line 18 and gas chamber 52 to diaphragm 48 in valve 19.

When such pressure becomes sufficient, diaphragm 48 transmits thrust through thrust member 49 and head 50 to cause disc 47 to snap into reverse curvature. This results in disc 47 striking the upper end of valve stem 43 a sharp blow, forcing the valve stem down and carrying valve head 44 to seat on valve seat 41 substantially closing passage 32 against the flow of liquid.

Disc 47 is constructed to have internal forces therein which will automatically return it to the form of Fig. 2 upon release of pressure thereon beyond a predetermined point.

When pressure of gas in space 9 falls to a predetermined level, member 51 raises diaphragm 48 carrying thrust member 49 and head 50 upward and disc 47 upon release of pressure to a predetermined level automatically snaps back into its original curvature; releasing pressure on valve stem 43. Leakage of liquid around valve head 44 due to pressure in line 32 then fills that portion of the body cavity below diaphragm 42 and exerts pressure on this diaphragm, lifting valve head 44 from seat 41. Full flow of liquid through valve 19 results.

Pipe 22 conducts gas from space 9 to the desired point for utilization. Since commercial liquid petroleum gases usually contain added odorants which are less volatile than the liquefied gases and may contain small amounts of heavy ends the valved pipe 23 is provided for occasionally withdrawing any liquid which may accumulate in space 9.

*Advantages*

This vaporizer is very economical in use, efficient in operation and easily serviced. All troubles caused by freezing of small quantities of water on the control valve mechanism are eliminated by the valve construction which provides all liquid contact with moving parts combined with a snap action movement in which the valve is closed by a sharp blow. This valve may easily be made responsive to small changes in pressure and a constant pressure in chamber 9 plus or minus one-half pound per square inch is commercially obtainable. A gentle vaporization of liquid over a large surface is obtained by the unique construction of this vaporizer. Chilled water is obtained as a by-product. Collection of condensed heavy ends and odorants in house gas lines is avoided.

Many obvious changes in construction may be made by those skilled in the art without departing from the spirit or substance of the invention which is defined by the subtended claims.

Having described my invention and explained its operation, I claim:

1. A vaporizer comprising in combination: a housing; a tube having a fluid inlet and a fluid outlet extending through said housing with the outer wall of said tube in fluidtight contact with walls of said housing; a moveable thermostat actuated valve head disposed in said tube adapted to be moved to seat upon and substantially close said outlet; a hollow cylinder of porous carbon disposed in said housing spacedly surrounding said tube and spaced from the walls of said housing; annular sealing members disposed between the ends of said cylinder and adjacent walls of said housing in fluidtight sealing relation therewith; a pipe inserted through a wall of said housing communicating with space within said housing between said tube and said carbon cylinder; a valve adapted to control fluid flow through said pipe comprising in combination, a valve body provided with a passage having an inlet adapted to be connected to a supply of liquid and an outlet connected to said pipe, said body having a cavity of diversified cross sectional area therein with a narrower portion of said cavity adjacent to and communicating with said passage, a valve seat disposed in said passage, a moveable valve head disposed in said passage adapted to be moved to seat upon said valve seat and thereby substantially close said passage, a flexible diaphragm disposed across said narrow portion of said cavity, a valve stem attached to said valve head and to said diaphragm extending through said diaphragm into said cavity, an annular support disposed in said cavity, a spheroidally curved disc supported thereon adjacent to the end of said valve stem normally curved away from said valve stem thereby permitting movement of said valve stem and valve head away from said valve seat but adapted to snap under pressure into substantially equal and opposite spherical curvature thereby striking said valve stem a sharp blow and forcing said valve stem to carry said valve head to seat on said valve seat, a larger flexible diaphragm disposed across a larger portion of said cavity, a thrust member attached to said diaphragm bearing a terminal rigid disc with raised edges adjacent to said curved disc adapted to transmit pressure from said diaphragm to said curved disc, means for resisting movement of said diaphragm toward said curved disc by a predetermined force, a pipe providing communication between that portion of said cavity lying on the side of said larger diaphragm opposite to said curved disc and space between a wall of said housing and said porous cylinder; means for withdrawing gas from said last mentioned space and means for withdrawing liquid from said space.

2. A vaporizer comprising in combination: a housing; a tube having a fluid inlet and a fluid outlet extending through said housing with the outer wall of said tube in fluidtight contact with walls of said housing; a moveable thermostat actuated valve head disposed in said tube adapted to be moved to seat upon and substantially close said outlet; a hollow cylinder of porous carbon disposed in said housing spacedly surrounding said tube and spaced from the walls of said housing; annular sealing members disposed between the ends of said cylinder and adjacent walls of said housing in fluidtight sealing relation therewith; a pipe inserted through a wall of said housing communicating with space within said housing between said tube and said carbon cylinder; means, comprising a valve actuated by a snap action curved disc responsive to pressure from within space between said cylinder and said housing, for controlling fluid flow through said pipe; means for withdrawing gas from an upper level in said space between said cylinder and housing; and means for withdrawing liquid from a lower level of the same space.

3. A vaporizer of the class described comprising in combination: a housing; a tube having a fluid inlet and a fluid outlet disposed in said housing; means, comprising a thermostat actuated valve, for substantially closing said fluid outlet; a hollow, porous carbon cylinder disposed in said housing spacedly surrounding said tube and with the sides of said cylinder spaced from said housing, means for introducing liquid between said tube and said cylinder; means, comprising a valve actuated by a snap action, pressure responsive curved disc, for controlling the quantity of liquid so introduced; means for actuating said last mentioned valve by pressure of gas confined in space between said cylinder and said housing; means for withdrawing gas from an upper portion of said last mentioned space and means for withdrawing liquid from a lower portion thereof.

4. A vaporizer comprising in combination: a housing; a tube having a fluid inlet and a fluid outlet disposed in said housing; temperature responsive means for substantially closing said fluid outlet; a hollow cylinder of inert, porous material disposed in said housing spacedly surrounding said tube and with the sides of said cylinder spaced from said housing; means for introducing liquid between said tube and said cylinder; means, responsive to pressure from within space between said cylinder and said housing, for controlling the quantity of liquid so introduced; and means for withdrawing gas from said space between said cylinder and said housing.

5. In a vaporizer of the class described, in combination: a housing; a tube having a fluid inlet and a fluid outlet extending through said housing; a hollow cylinder of porous inert material disposed in said housing spacedly surrounding said tube and with the sides thereof spaced from the walls of said housing; and means for introducing liquid between said tube and said cylinder.

6. In a vaporizer of the class described, in combination: a housing; a tube having a fluid inlet and a fluid outlet extending through said housing; a thermostat actuated valve head disposed in said housing adapted to be moved to seat upon and substantially close said outlet; a hollow cylinder of porous carbon disposed in said housing spacedly surrounding said tube and with the sides thereof spaced from the walls of said housing; means for introducing liquid between said tube and said cylinder; and means for controlling the quantity of liquid so introduced.

ARTHUR N. KERR.

REFERENCES CITED

The following references are of record in the file of this patent:

UNITED STATES PATENTS

| Number | Name | Date |
| --- | --- | --- |
| 1,719,687 | Browne | July 2, 1929 |
| 1,752,166 | Ford | Mar. 25, 1930 |
| 1,947,099 | Painter | Feb. 13, 1934 |
| 2,214,298 | Gilbert | Sept. 10, 1940 |
| 2,273,257 | Gardner | Feb. 17, 1942 |
| 2,294,107 | Beck | Aug. 25, 1942 |
| 2,336,647 | Spangenberg | Dec. 14, 1943 |